(12) United States Patent
Sargent et al.

(10) Patent No.: US 10,751,973 B2
(45) Date of Patent: Aug. 25, 2020

(54) ARCHITECTURAL MEMBRANE

(71) Applicant: SAINT-GOBAIN PERFORMANCE PLASTICS CORPORATION, Solon, OH (US)

(72) Inventors: Joseph G. Sargent, Lowell, MA (US); Michael P. Cushman, Williamstown, MA (US); Michael J. Lussier, Hooksett, NH (US); James M. McMartin, Hooksett, NH (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 0 days.

(21) Appl. No.: 15/464,909

(22) Filed: Mar. 21, 2017

(65) Prior Publication Data
US 2017/0266914 A1 Sep. 21, 2017

Related U.S. Application Data

(60) Provisional application No. 62/311,173, filed on Mar. 21, 2016.

(51) Int. Cl.
*B32B 5/26* (2006.01)
*B32B 5/02* (2006.01)
(Continued)

(52) U.S. Cl.
CPC .............. *B32B 5/028* (2013.01); *B32B 5/024* (2013.01); *B32B 5/26* (2013.01); *B32B 7/04* (2013.01);
(Continued)

(58) Field of Classification Search
CPC ........ B32B 2262/101; B32B 2307/402; B32B 2419/06; B32B 27/322; B32B 37/06; B32B 5/02
See application file for complete search history.

(56) References Cited

U.S. PATENT DOCUMENTS 4,467,005 A 8/1984 Pusch et al.
4,528,051 A 7/1985 Heinze et al.
(Continued)

FOREIGN PATENT DOCUMENTS

CN 103097126 A 5/2013
DE 3832828 A1 4/1990
(Continued)

OTHER PUBLICATIONS

SGM™-9 Mesh Architectural Products; www.sheerfill.com; Jan. 2013; 1 page; Saint-Gobain Performance Plastics; Merrimack, US.
(Continued)

*Primary Examiner* — Arti Singh-Pandey
(74) *Attorney, Agent, or Firm* — Abel Schillinger, LLP; Chi Suk Kim

(57) ABSTRACT

A composite fabric laminate can include an open mesh fabric, a first continuous film comprising a fluoropolymer, and a second continuous film comprising a fluoropolymer. The fluoropolymer of the first continuous film and the fluoropolymer of the second continuous films can be in direct contact with one another. A method of forming a composite fabric laminate that includes disposing an open mesh fabric between a first continuous film and a second continuous film, each comprising an at least partially unsintered fluoropolymer film, to form a composite; laminating the composite at a pressure of at least 100 psig and a temperature of no greater than 350° C.; and sintering the laminated composite to form the composite fabric laminate.

20 Claims, 3 Drawing Sheets

(51) Int. Cl.
*B32B 7/04* (2019.01)
*B32B 25/10* (2006.01)
*B32B 25/20* (2006.01)
*B32B 27/12* (2006.01)
*B32B 27/18* (2006.01)
*B32B 27/28* (2006.01)
*B32B 27/30* (2006.01)
*B32B 27/32* (2006.01)
*B32B 37/24* (2006.01)
*E04D 5/02* (2006.01)
*E04D 5/10* (2006.01)

(52) U.S. Cl.
CPC .............. *B32B 25/10* (2013.01); *B32B 25/20* (2013.01); *B32B 27/12* (2013.01); *B32B 27/18* (2013.01); *B32B 27/285* (2013.01); *B32B 27/304* (2013.01); *B32B 27/322* (2013.01); *B32B 37/24* (2013.01); *E04D 5/02* (2013.01); *E04D 5/10* (2013.01); *B32B 2250/03* (2013.01); *B32B 2255/205* (2013.01); *B32B 2255/26* (2013.01); *B32B 2260/021* (2013.01); *B32B 2260/046* (2013.01); *B32B 2262/02* (2013.01); *B32B 2262/0253* (2013.01); *B32B 2262/0269* (2013.01); *B32B 2262/0276* (2013.01); *B32B 2262/101* (2013.01); *B32B 2262/106* (2013.01); *B32B 2262/14* (2013.01); *B32B 2264/101* (2013.01); *B32B 2270/00* (2013.01); *B32B 2305/186* (2013.01); *B32B 2305/38* (2013.01); *B32B 2305/80* (2013.01); *B32B 2307/30* (2013.01); *B32B 2307/3065* (2013.01); *B32B 2307/40* (2013.01); *B32B 2307/402* (2013.01); *B32B 2307/4026* (2013.01); *B32B 2307/412* (2013.01); *B32B 2307/422* (2013.01); *B32B 2307/50* (2013.01); *B32B 2307/54* (2013.01); *B32B 2307/546* (2013.01); *B32B 2307/581* (2013.01); *B32B 2307/5825* (2013.01); *B32B 2307/71* (2013.01); *B32B 2307/712* (2013.01); *B32B 2307/718* (2013.01); *B32B 2307/7246* (2013.01); *B32B 2307/732* (2013.01); *B32B 2309/02* (2013.01); *B32B 2309/12* (2013.01); *B32B 2327/12* (2013.01); *B32B 2419/00* (2013.01); *B32B 2419/06* (2013.01); *B32B 2457/00* (2013.01)

(56) References Cited

U.S. PATENT DOCUMENTS

| | | |
|---|---|---|
| 4,529,633 A | 7/1985 | Karlsson |
| 4,594,286 A | 6/1986 | McKinney et al. |
| 4,731,283 A | 3/1988 | Sakane et al. |
| 4,883,716 A | 11/1989 | Effenberger et al. |
| 4,913,978 A | 4/1990 | Klotz et al. |
| 5,141,800 A | 8/1992 | Effenberger et al. |
| 5,194,335 A | 3/1993 | Effenberger et al. |
| 5,357,726 A | 10/1994 | Effenberger et al. |
| 5,759,924 A | 6/1998 | Sahlin |
| 2004/0219851 A1* | 11/2004 | Sahlin ............... B32B 5/08 442/254 |
| 2004/0261929 A1 | 12/2004 | Tippett |
| 2005/0164581 A1 | 7/2005 | Mathiesen |
| 2010/0159223 A1 | 6/2010 | Keese et al. |
| 2012/0058326 A1 | 3/2012 | Tippett et al. |
| 2016/0097155 A1* | 4/2016 | Fan ............... D06N 3/0011 442/88 |

FOREIGN PATENT DOCUMENTS

| | | |
|---|---|---|
| DE | 29620579 U1 | 6/1997 |
| EP | 0164278 A1 | 12/1985 |
| EP | 0327047 A2 | 8/1989 |
| EP | 0905302 A1 | 3/1999 |
| EP | 1629972 A1 | 3/2006 |
| EP | 2915667 B1 | 1/2018 |
| GB | 1369285 A | 10/1974 |
| JP | S62189153 A | 8/1987 |
| JP | H0444841 A | 2/1992 |
| JP | H04300363 A | 10/1992 |
| JP | H08230118 A | 9/1996 |
| JP | 2002307611 A | 10/2002 |
| JP | 3393787 B2 | 4/2003 |
| JP | 2004507386 A | 3/2004 |
| JP | 2004284222 A | 10/2004 |
| JP | 2005022401 A | 1/2005 |
| JP | 2014061702 A | 4/2014 |
| JP | 2014091236 A | 5/2014 |
| JP | 2015116829 A | 6/2015 |
| WO | 1989012135 A1 | 12/1989 |
| WO | 1992009429 A1 | 6/1992 |
| WO | 2001096695 A1 | 12/2001 |
| WO | 02/18133 A2 | 3/2002 |
| WO | 2006021215 A1 | 3/2006 |
| WO | 2011146157 A2 | 11/2011 |
| WO | 20170165384 A1 | 9/2017 |

OTHER PUBLICATIONS

John Effenberger, Sheertill Permanent Architectural Fabrics and Structures from Chemfab, presented at Symposium on Air-Supported Structures: State of the Art, Jun. 4, 1980, GB.

H. Fitz, Neue Wege im Einsatz von Fluorkunststoffen für transparente Überdachungen, Technische Rundschau, No. 51/52, Dec. 1983, Bern CH, pp. 10-13.

Hostaflon-beschichtete Glasgewebe, Chemiefasern/Textilindustrie, Jun. 1990, pp. t86-t88, vol. 40, No. 6, Frankfurt/DE.

Partial Supplementary European Search Report for EP Application No. EP17770964.9, dated Feb. 12, 2020, 9 pages.

\* cited by examiner

ARCHITECTURAL MEMBRANE

CROSS-REFERENCE TO RELATED APPLICATION

This Application claims priority under 35 U.S.C. § 119(e) to U.S. Provisional Application No. 62/311,173, entitled "ARCHITECTURAL MEMBRANE," by Joseph G. SARGENT et al, filed Mar. 21, 2016, which is assigned to the current assignee hereof and is incorporated herein by reference in its entirety.

FIELD OF THE DISCLOSURE

The present disclosure relates to fluoropolymer membranes, and more particularly to fabric-reinforced fluoropolymer membranes.

RELATED ART

Fabric-reinforced fluoropolymer membranes can be employed in a variety of industries. In general, such membranes are known to be resistant to the accumulation of dirt and grime and have a low coefficient of friction. There exists a need for fluoropolymer membranes to also exhibit high strength, high durability, high light transmission, good energy efficiency, or a combination thereof.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the fluoropolymer membrane arts.

Figure 1:
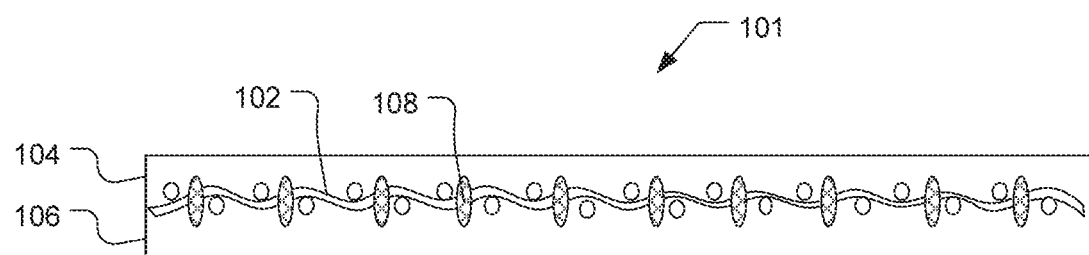
FIG. 1 includes an illustration of a cross-section of a fluoropolymer membrane according to certain embodiments described herein.

Embodiments of the fluoropolymer membranes can include a fabric-reinforced fluoropolymer membrane. For example, the fluoropolymer membrane can include a fabric having a fluoropolymer layer disposed on opposing surfaces of the fabric. Further, during formation of the fabric-reinforced fluoropolymer membrane, the long chains of the fluoropolymer molecules of the opposing fluoropolymer layers can get entangled. In particular embodiments, the entanglement occurs when mating surfaces are in an unfused state. In certain embodiments, the entanglements of fluoropolymer molecules can increase the strength and durability of the fluoropolymer membrane, in some cases without diminishing optical properties or energy efficiency. For example, certain embodiments of the fluoropolymer membrane described herein can have a high strength, a high durability, a high light transmission, a good energy efficiency (with the addition of appropriate fillers), or a combination thereof. The concepts are better understood in view of the embodiments described below that illustrate and do not limit the scope of the present invention As illustrated in FIG. 1, a fluoropolymer membrane 101 can include at least a fabric layer 102, a fluoropolymer layer 104, and a fluoropolymer layer 106. The fluoropolymer layer 104 can be disposed on a major surface of the fabric 102 and the fluoropolymer layer 106 can be disposed on an opposite major surface of the fabric 102. As discussed above, and as will be discussed in more detail below, the fluoropolymer molecules of the fluoropolymer layers 104 and 106 can interact to form entanglements 108 through the fabric 102.

The fabric can be a mesh fabric. As used herein, the term "mesh" refers to an apertured material comprising cords, wires, or threads woven into a network defining the apertures or a solid sheet having apertures cut, punched, or otherwise formed therein. The mesh may be flexible or rigid and the apertures are typically of uniform size and spacing. In certain embodiments, the mesh fabric can be an open mesh fabric. As used herein, the term "open mesh" refers to a mesh having a percentage open area of at least 5%. As used herein, the term "percentage open area" refers to a percentage of the area of the apertured material that is taken up by the open area of the apertures. When the fabric is not a mesh fabric, it becomes more difficult to form entanglements between the fluoropolymer layers.

Figure 2:
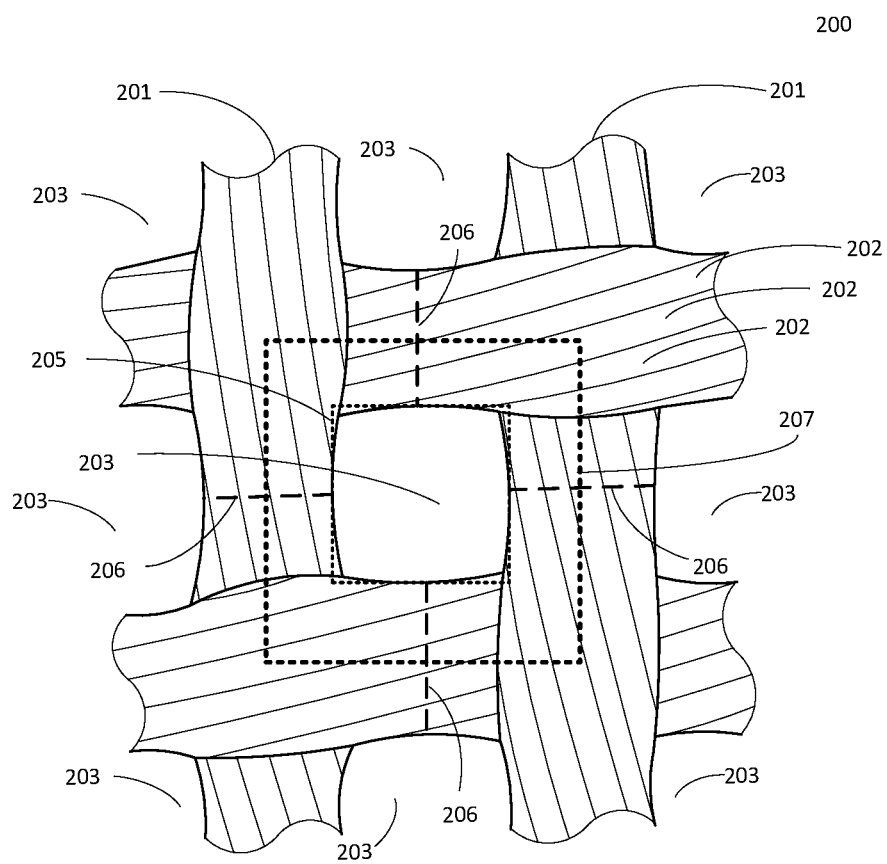
FIG. 2 includes an illustration of a fabric 200 with an open mesh according to an embodiment.

FIG. 2 includes an illustration of a fabric 200 with an open mesh according to an embodiment. As shown in FIG. 2, the fabric 200 may contain a plurality of threads 201. According to an embodiment, each thread 201 may contain a plurality of filaments 202. According to another embodiment, the threads 201 may form a fabric 200 with apertures 202.

The percentage open area of the mesh is measured by capturing an image of the material using a scanner. A representative section of the image is then enlarged to show detail and to make measurements more accurate. The fabric is then measured by first drawing a rectangle that fully encompasses an aperture. Then, a second rectangle is drawn that represents the unit cell of the mesh fabric, being the smallest repeatable component which fully captures the geometry of the fabric. This rectangle is created by drawing four lines, one line to connect the aperture to each adjacent aperture, and then drawing a rectangle that bisects each of the four lines. The areas of both rectangles are then calculated by multiplying the length by the width. The percent open area is then determined by dividing the area of the first rectangle by the area of the second rectangle. While a rectangle is generally appropriate for many types of fabric weaves, other shapes such as circles, triangles, hexagons, and octagons, may be used for fabrics in which the open area and the unit cell are not readily approximated by rectangles.

For example, returning to FIG. 2, a rectangle 205 is drawn that fully encompasses an aperture 203. A series of lines 206 are drawn, one line 206 to connect the aperture 203 to each adjacent aperture 203, and a rectangle 207 is drawn that bisects each of the lines 206. The percent open area is calculated as the area of rectangle 205 divided by the area of rectangle 207.

In certain embodiments, the open mesh fabric can have a percentage open area of at least 10%, at least 15%, or at least 20%. When the open mesh fabric has a percentage open area of less than 10%, the opportunity for the fluoropolymer molecules of the opposing fluoropolymer layers to interact is diminished. In further embodiments, the open mesh fabric can have a percentage open area of no greater than 50%, no greater than 45%, or no greater than 40%. When the open mesh fabric has a percentage open area of greater than 50%, the strength of the fabric diminishes. Moreover, the open mesh fabric can have a percentage open area in a range of any of the above minimum and maximum values, such as in a range of 10% to 50%, 15% to 45%, or 20% to 40%. Although in certain embodiments the strength of the fabric may diminish at around 50% open area, it will be understood that other embodiments, such as those used for certain façade membranes, can incorporate lower strength materials such as a fabric having a percentage open area of greater than 50%. Such lower strength materials can have the advantage of increased light transmission.

In certain embodiments, the fabric can have a weight of at least 100 grams per square meter (gsm), at least 350 gsm, at least 400 gsm, at least 450 gsm, or at least 500 gsm. In further embodiments, the fabric can have a weight of no greater than 1500 gsm, no greater than 1400 gsm, no greater than 1300 gsm, or no greater than 1200 gsm. Moreover, the fabric can have a weight in a range of any of the above minimum and maximum values, such as 350 to 1500 gsm, 400 to 1400 gsm, 450 to 1300 gsm, or 500 to 1200 gsm. As used herein, the term "gsm" refers to grams per square meter.

The fabric can comprise a material formed of fibers comprising an aramid, a fluorinated polymer, a fiberglass, a graphite, a polyimide, a polyphenylene sulfide, a polyketone, a polyester, or a combination thereof. In particular embodiments, the fabric can comprise a material formed of fibers comprising a fiberglass. A fiberglass fabric can have the advantage of increased fire resistance, low elongation after tensioning, increased resistance to ultraviolet radiation, and increased weatherability as compared to some other materials. Further, an aramid fabric can exhibit increased tear, cut, and fold resistance, as well as improved flexibility. Furthermore, a fabric comprising a aramid and fiberglass fibers can provide a synergistic combination of the properties discussed above. In further embodiments, the fabric can include a coated material, apart from the fluoropolymer layer discussed above. For example, the fabric can include a material formed of fibers coated with a polymer. In particular embodiments, the polymer can include a fluoropolymer, such as a perfluoropolymer, such as a polytetrafluoroethylene. In more particular embodiments, the fabric can include a fiberglass material coated with a polymeric coating, such as a fluoropolymer coating, such as a polytetrafluoroethylene coating.

The fluoropolymer layer can include a continuous layer comprising a fluoropolymer. As used herein, the term "continuous" refers to layer that is essentially uninterrupted from a beginning reference point to an ending reference point. The term "essentially," at least in the context of a continuous layer, accounts for minimal insignificant breaks or fissures in an otherwise continuous layer. In further embodiments, the outermost surface of the fluoropolymer membrane can have a substantially uniform contour. In particular embodiments, the fluoropolymer layer can define the outermost surface of the fluoropolymer membrane. Furthermore, the substantially uniform contour can include a smooth contour.

The fluoropolymer layer can comprise a fluoropolymer, such as a perfluoropolymer, such as a fluoropolymer comprising a polytetrafluoroethylene (PTFE), a perfluoroalkyl-vinyl ether (PFA), a polyhexafluoropropylene (HFP), a fluorinated ethylene-propylene copolymer (FEP), an ethylene tetrafluoroethylene copolymer (ETFE), a polyvinylidene fluoride (PVDF), a polychlorotrifluoroethylene (PCTFE), a co-polymer including perfluoropropylene-vinyl-ether (PPVE), such as a modified PTFE including a perfluoropropylene-vinyl-ether, a perfluoromethyl vinyl ether (MFA), an any combination thereof. In particular embodiments, the combination of fluoropolymers can include a blend of PTFE and FEP or PFA, such as 3% FEP or PFA. However, in certain embodiments, FEP can diminish the visual clarity of the fluoropolymer membrane. For example, FEP can diffract light and generate haze. Thus, in particular embodiments, the fluoropolymer layer can be free of a fluorinated ethylene-propylene copolymer (FEP). For example, all fluoropolymer layers can be free of FEP or other copolymers such that the fluoropolymer layers directly contact one another. Further, the entire fluoropolymer membrane can be free of FEP.

The fluoropolymer layer can include a blend of fluoropolymer and a silicone elastomer. In certain embodiments, the fluoropolymer layer is formed by multiple passes of applying the fluoropolymer layer. In particular embodiments, any of the passes can include the fluoropolymer-silicone elastomer blend. In more particular embodiments, the first pass can include a fluoropolymer-silicone elastomer blend. In certain embodiments, the fluoropolymer-elastomer blend can provide an improved flexibility to the coated fabric. Further, the coated fabric can be coated with a silicone oil. In particular embodiments, the silicone oil can be applied on its own or blended with a fluoropolymer. In certain embodiments, the silicone oil, alone or in a fluoropolymer blend, can improve the flexibility, weatherability, or both, of the coated fabric.

The fluoropolymer layer can comprise an extruded film, a skived film, or a cast film. In certain embodiments, the fluoropolymer layer can comprises a cast film. In particular embodiments, the cast film can be made up of a plurality of thin layers which have been individually deposited, at least partially sintered and fused together to produce a material having more uniform properties than can be achieved by other manufacturing process. In particular embodiments, the layers of the cast film can all have the same composition (e.g., formed of the same fluoropolymer) or the layers of the cast film can include at least one layer that has a different composition than the other layer in the cast film. For example, the cast film can be comprised of primarily PTFE layers and at least the outermost layer can be comprised of FEP or PFA. Further, in particular embodiments, the cast film can be more optically clear than other forms of films. In more particular embodiments, a cast film can have a greater elongation and, thus, providing an increased opportunity for interaction, working, and entanglement of fluoropolymer molecules of opposing fluoropolymer layers.

In certain embodiments, the fluoropolymer layer can include additives that provide a desired functionality. In particular embodiments, the fluoropolymer layer can include a pigment so as to provide a colored or tinted film. In particular embodiments, the fluoropolymer layer can include infrared control additives, such as an infrared (IR) reflective additive, an IR absorbing additive, or a combination thereof. In particular embodiments, the fluoropolymer layer can include an additive that provides texture, such as a glass bead. In further embodiments, the fluoropolymer layer can include a pigment. For example, the fluoropolymer layer can include a pigmented coating material with a variety of colors or a homogeneous, constant transparency and color.

In certain embodiments, the fluoropolymer membrane can include a photocatalytic surface. In particular embodiments the photocatalytic surface can include a titanium dioxide dispersed within the photocatalytic layer. The photocatalytic layer can be the surface of the fluoropolymer layer or applied as a topcoat after lamination. The activity of the photocatalytic surface can be measured by Methylene Blue Mineralization, according to ISO 10678:2010. In certain embodiments, the photocatalytic surface can have an activity of at least 5 mol/m$^2$ h, or at least 7 mol/m$^2$ h, at least 9 mol/m$^2$ h, or even at least 10 mol/m$^2$ h. In other embodiments, the photocatalytic surface can have an activity of no greater than 40 mol/m$^2$ h, no greater than 35 mol/m$^2$ h, or no greater than 30 mol/m$^2$ h. Moreover, the activity of the photocatalytic surface can be in a range of any of the above values, such as 5 to 40 mol/m$^2$ h, 7 to 35 mol/m$^2$ h, or even 10 to 30 mol/m$^2$ h.

The fluoropolymer layer disposed on the first major surface can have a same or different composition than the fluoropolymer layer disposed on the second major surface of the fabric. In particular embodiments, the fluoropolymer layer has the same composition on the first and second major surfaces of the fabric.

In certain embodiments, at least one of the fluoropolymer layers, or each of the fluoropolymer layers, can have a thickness of at least about 0.2 mils, at least about 0.25 mils, or at least about 0.3 mils. In certain embodiments, the fluoropolymer membrane can have a thickness of at least about 0.8 mils, at least about 0.9 mils, or at least about 1 mil.

In certain embodiments, the fluoropolymer membrane can comprise the fabric in an amount of at least 10 wt. %, at least 15 wt. %, at least 20 wt. %, at least 25 wt. %, at least 30 wt. %, at least 35 wt. %, or even at least 40 wt. %, by weight of the fluoropolymer membrane. In further embodiments, the fluoropolymer can comprise the fabric in an amount of no greater than 60 wt. %, no greater than 55 wt. %, or no greater than 50 wt. %, by weight of the fluoropolymer membrane. Moreover, the fluoropolymer membrane can comprise the fabric in an range of any of the above minimum and maximum values, such as in a range of 10 wt. % to 60 wt. %, 20 wt. % to 55 wt. %, or 30 wt. % to 50 wt. %, by weight of the fluoropolymer membrane.

The fluoropolymer membrane can be a composite laminate formed by a lamination process. The lamination process can include a moderate thermal mechanical lamination process where the lamination takes place at relatively low temperature and high pressure. The low temperature lamination permits more workability of the fluoropolymer layers at least because lamination at high temperatures can sinter the fluoropolymer layers, reducing the workability of those layers. As the fluoropolymer layers are pressed at relatively low temperatures, the long chains of the fluoropolymer molecules of the opposing fluoropolymer layers can become entangled with each other.

The lamination process can include providing a fabric and first and second continuous films, disposing the fabric between the first and second continuous films, and laminating the composite. In particular embodiments, the first and second continuous films can include at least partially unsintered fluoropolymer films. The at least partially unsintered films can include one or more of the features described above for the fluoropolymer film except that it is at least partially unsintered. The films can be at least partially unsintered to improve tack between the opposing fluoropolymer layers and, thereby, increasing the interaction, working, and entanglement between the fluoropolymer molecules of the opposing fluoropolymer layers.

In certain embodiments, the composite can be laminated at a pressure of at least 100 psig at least 100 psig, at least 200 psig, at least 300 psig, at least 400 psig, at least 500 psig, at least 600 psig, at least 700 psig, or even at least 800 psig. In further embodiments, the composite can be laminated at a pressure of no greater than 2500 psig, no greater than 2300 psig, no greater than 2100 psig, no greater than 1900 psig, or even no greater than 1700 psig. Moreover, the composite can be laminated at a pressure of any of the above minimum and maximum values, such as in a range of 200 psig to 2500 psig, 300 psig to 2300 psig, 400 psig to 2100 psig, 500 psig to 1900 psig, or even 600 psig to 1700 psig.

In certain embodiments, the composite can be laminated at a temperature of no greater than 350° C., no greater than 300° C., no greater than 250° C., no greater than 200° C., no greater than 175° C., or even no greater than 150° C. In further embodiments, the composite can be laminated at a temperature of at least ambient temperature, such as at least 20° C., but may be accomplished at temperatures of at least 50° C., at least 100° C., or at least 120° C. Moreover, the composite can be laminated at a temperature in a range of any of the above minimum and maximum values, such as in a range of 100° C. to 350° C., 110° C. to 300° C., or 120° C. to 200° C.

As discussed above, the fluoropolymer layer can be at least partially unsintered. Thus, the laminated composite can be sintered after lamination. In certain embodiments, the laminated composite can be sintered at a temperature of at least 350° C., at least 375° C., or at least 400° C. In further embodiments, the laminated composite can be sintered at a temperature of no greater than 1000° C., no greater than 800° C., or no greater than 600° C. Moreover, the laminated composite can be laminated at a temperature in a range of any of the above minimum or maximum values, such as in a range of 350° C. to 1000° C., 375° C. to 800° C., or 400° C. to 600° C.

The fluoropolymer membrane can exhibit a variety of optical and mechanical properties.

It is a particular advantage that certain embodiments the fluoropolymer membrane can exhibit a high visible light transmission ("VLT"). The VLT of the fluoropolymer membrane is measured according to ASTM E424-71(2015). In certain embodiments, the fluoropolymer membrane can have a VLT of at least 26%, at least 28%, at least 30%, or at least 32%. That being said, the fluoropolymer membrane can have a VLT as low as 6%, 8%, 10%, 15%, 20%, or 25% for certain applications. Further, although some applications may desire as high a transmission as possible, the fluoropolymer may have a VLT of no greater than 99%, no greater than 95%, no greater than 90%, or even no greater than 85%. Moreover, the fluoropolymer membrane can have a VLT in a range of any of the above minimum or maximum values, such as in a range of 20% to 99%, 25% to 99%, 26% to 99%, 28% to 95%, 30% to 90%, or even 32% to 85%.

It is a particular advantage that certain embodiments of the fluoropolymer membrane can exhibit a low solar heat gain coefficient ("SHGC"). The SHGC of the fluoropolymer membrane is measured according to ASTM E424-71(2015). In certain embodiments, the fluoropolymer membrane can have an SHGC of no greater than 0.5, no greater than 0.4, or no greater than 0.3. In further embodiments, the fluoropolymer membrane can have an SHGC of at least 0.05, at least 0.1, at least 0.15, or at least 0.2. Moreover, the fluoropolymer membrane can have an SHGC in a range of any of the above minimum or maximum values, such as in a range of 0.05 to 0.5, 0.1 to 0.4, or 0.2 to 0.3.

It is a particular advantage that certain embodiments of the fluoropolymer membrane can exhibit a high tensile strength. The tensile strength of the fluoropolymer membrane is measured according to ASTM D4851-88 In certain embodiments, the fluoropolymer membrane can have a tensile strength of at least 200 pounds per linear inch (PLI), at least 300 PLI, at least 400 PLI, or at least 500 PLI, or in a range of 200 to 1200 PLI, or in a range of 500 to 1200 PLI.

It is a particular advantage that certain embodiments of the fluoropolymer membrane can exhibit a high elongation. The elongation of the fluoropolymer membrane is measured according to ASTM D1682-64(1975)e1. In certain embodiments, the fluoropolymer membrane can have an elongation of at least 1%, at least 1.5%, or at least 2%. In further embodiments, the fluoropolymer membrane can have an elongation of no greater than 15%, no greater than 8%, or no greater than 4%. Moreover, the fluoropolymer membrane can have an elongation in a range of any of the above minimum or maximum values, such as in a range of 1% to 15%, 1.5% to 8%, or 2% to 4%. In further embodiments, particularly when the fluoropolymer membrane is reinforced with a fabric, such as a fiberglass fabric, the elongation is reduced. For example, the elongation can be no greater than 2%, no greater than 1.5%, or even no greater than 1%. In yet further embodiments, the elongation of the reinforced membrane can be even 0% once properly tensioned.

It is a particular advantage that certain embodiments of the fluoropolymer membrane can exhibit a low vapor permeation rate. The vapor permeation rate of the fluoropolymer membrane is measured according to ASTM F1249. In certain embodiments, the fluoropolymer membrane can have a vapor permeation rate in a range of 1 g/[m$^2$-day] to 10 g/[m$^2$-day], or in a range of 10 g/[m$^2$-day] to 20 g/[m$^2$-day].

It is a particular advantage that certain embodiments of the fluoropolymer membrane can exhibit a high flexfold resistance. The flexfold resistance of the fluoropolymer membrane is measured according to the warp or fill (weft) break strength test of ASTM 751 retained by a sample after undergoing a Flex Fold test, which is expressed as a percentage of the original warp or fill (weft) break strength prior to flexing test by which a 10-lbs roller is used to roll over folded fabric 10 times. In certain embodiments, the fluoropolymer membrane can have a flexfold resistance of at least 50%, at least 60%, or at least 70%. In further embodiments, the fluoropolymer membrane can have a flexfold resistance of at least 80%, at least 90%, or even up to 100%.

The fluoropolymer membrane can have application in a variety of different technical fields. In certain embodiments, the fluoropolymer membrane can be an architectural fabric. For example, an architectural structure can include an architectural fabric comprising the fluoropolymer membrane described herein. The architectural structure can include a skylight, a roof, a façade, a radome, and the like.

The invention will be further described with reference to the following non-limiting Examples. It will be apparent to those skilled in the art that many changes can be made in the embodiments described without departing from the scope of the present invention. Thus the scope of the present invention should not be limited to the embodiments described in this application, but only by embodiments described by the language of the claims and the equivalents of those embodiments. Unless otherwise indicated, all percentages are by weight.

EXAMPLES

Two different fluoropolymer film samples were prepared. To better compare the light transmission properties, the samples were each prepared without a fabric reinforcement layer. The films were manufactured by way of a casting process where polymer dispersions are applied to a carrier belt in multiple passes. Once the desired thickness has been achieved the films are stripped from the carrier belt. Film Type 1 (PTFE) contained only PTFE and had a final thickness of 0.009 inches (0.228 mm). Film Type 2 (PTFE/FEP) was made using the same casting process as Sample 1 but included a layer of a copolymer, melt process-able FEP, bonded to the PTFE layer. Film Type 2 (PTFE/FEP) had a final thickness of 0.010 inches (0.254 mm).

Sample 1 was manufactured by calendering together two pieces of Film Type 1 (PTFE), then sintering the sample in an oven at 700° F. (371° C.) for 2 minutes to finalize the bond between the two pieces. Sample 1 had a final thickness of 0.020 inches (0.528 mm).

Comparative Sample 2 was manufactured by arranging two pieces of Film Type 2 (PTFE/FEP) so that the FEP layer of the first piece contacted the FEP layer of the second piece. The arranged pieces were placed in a heated press for 3 minutes at a temperature of 615° F. (324° C.). The FEP layers adhered to one another, resulting in a film having a combined FEP layer between two PTFE layers. Comparative Sample 2 had a final thickness of 0.020 inches (0.528 mm).

Figure 3:
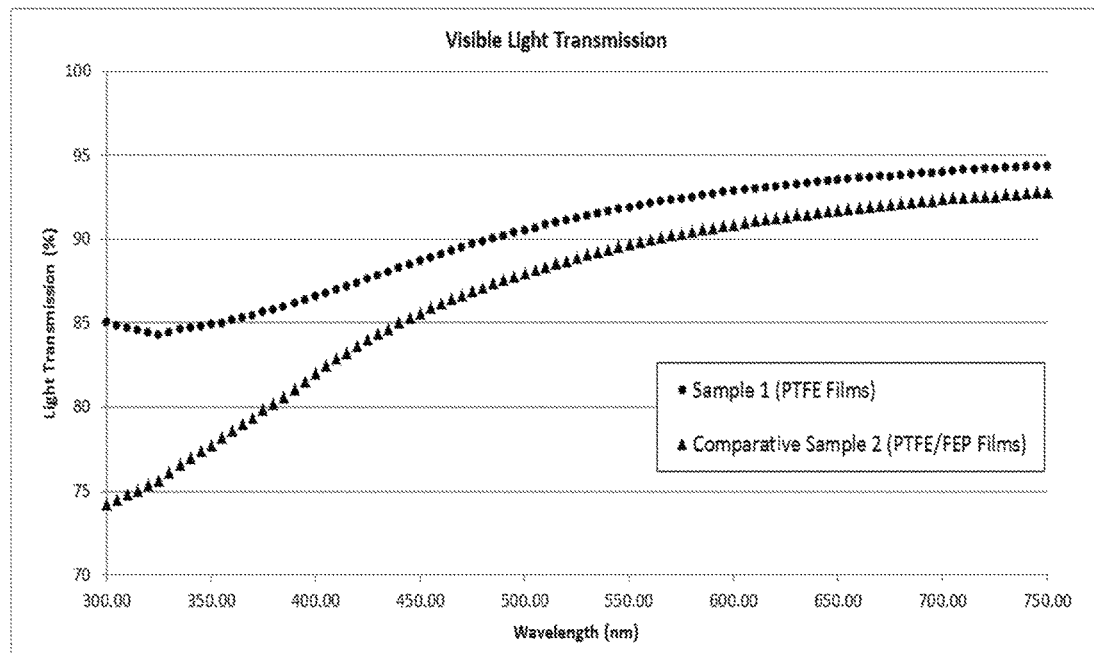
FIG. 3 shows light transmission test results of Sample 1 and Comparative Sample 2.

FIG. 3 shows light transmission test results of Sample 1 and Comparative Sample 2. The measurements were conducted using a Perkin Elmer Lambda 950 UV-Vis-NIR Spectrophotometer. The results shown in FIG. 3 indicate a higher level of visible light transmission through Sample 1, which contains only PTFE, than through Comparative Sample 2, which contains a layer of FEP copolymer between two PTFE layers. Without being bound by theory, it is believed that the presence of a copolymer layer causes diffraction of the light passing through the sample which diminishes the total visible light transmitted.

Figure 4:
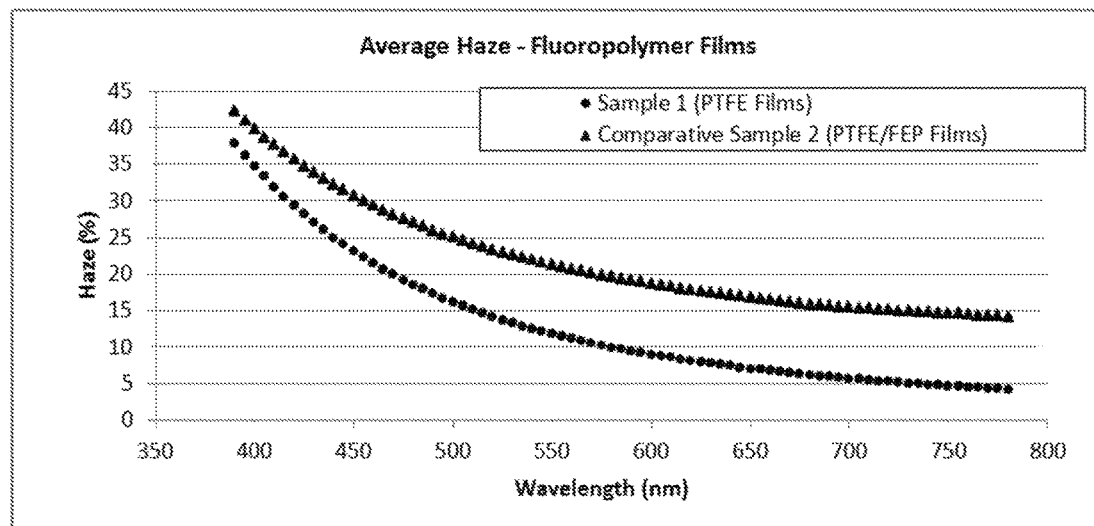
FIG. 4 shows haze test results of Sample 1 and Comparative Sample 2 according to ASTM D1003-13: Standard Test Method for Haze and Luminous Transmittance of Transparent Plastics.

FIG. 4 shows haze test results of Sample 1 and Comparative Sample 2 according to ASTM D1003-13: Standard Test Method for Haze and Luminous Transmittance of Transparent Plastics. As with the visible light transmittance testing, a Perkin Elmer Lambda 950 Spectrophotometer equipped with a Labsphere 150 mm Integrating Sphere was used. The results of this test shown in FIG. 4 show that Sample 1, which contains only PTFE, exhibited significantly less haze as compared with Comparative Sample 2 which contains a layer of FEP copolymer between two PTFE layers. This lower level of haze allows for greater visibility through the film and thus through the overall composite.

Samples of the mesh laminate were produced. Sample 3 was made using an open mesh glass fabric that was coated with PTFE. The percentage open area of this mesh was measured and calculated to be 29%. The films used to make this laminate were PTFE without a copolymer as in Film Type 1 described above and had a thickness of 0.012 inches (0.305 mm). A calendering process was used to laminate one film to each side of the mesh fabric. The material was then sintered at 700° F. (371° C.) in a coating tower to finalize the film bond.

Several physical properties of Sample 3 were tested and quantified. Sample 3 had a tensile strength at break of 841 pli (7364 N/5 cm) in the warp direction and 630 pli (5516 N/5 cm) in the fill direction as measured by ASTM D4851-88. A flexfold test was carried out on Sample 3 by folding specimens in half, end to end, and rolling a 10 lb (44.5 Newton) roller across the folded edge ten times in the same direction. The tensile strength at break of Sample 3 after the flexfold test was measured and found to be 864 pli (7565 N/5 cm) in the warp direction and 579 pli (5069 N/5 cm) in the fill direction. This corresponds to a flexfold tensile strength retention of 100% in the warp direction and a flexfold tensile strength retention of greater than 90% in the fill direction. The trap tear strength of Sample 3 as measured by ASTM D4851-88 was 224 (1961 N/5 cm) lbs in the warp direction and 180 lbs (1576 N/5 cm) in the fill direction. The visible light transmission of Sample 3 was measured at 33%. Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1

A composite fabric laminate comprising: an open mesh fabric having an open area of at least 15%; a first continuous film comprising a fluoropolymer; and a second continuous film comprising a fluoropolymer, wherein the first and second continuous films are disposed on opposing surfaces of the open mesh fabric, and wherein the composite fabric laminate has a visible light transmission (VLT) of at least 20% and a tensile strength of at least 200.

Embodiment 2

A composite fabric laminate comprising: an open mesh fabric comprising a plurality of openings; a first continuous film comprising a cast fluoropolymer film; and a second continuous film comprising a cast fluoropolymer film; wherein the first and second continuous films are disposed on opposing surfaces of the open mesh fabric and are attached to each other at attachment points that exhibit working and deforming of fluoropolymer molecules.

Embodiment 3

A method of forming a composite fabric laminate, comprising: providing a first and second continuous films, each comprising an at least partially unsintered fluoropolymer film; providing an open mesh fabric; disposing the fabric between the at least partially unsintered first and second continuous films to form a composite; laminating the composite at a pressure of at least 100 psig and a temperature of no greater than 350° C.; and sintering the laminated composite to form the composite fabric laminate.

Embodiment 4

The composite fabric laminate or method of any one of the preceding embodiments, wherein the open mesh fabric has an open area of at least 10%, at least 15%, or at least 20%.

Embodiment 5

The composite fabric laminate or method of any one of the preceding embodiments, wherein the open mesh fabric has an open area of no greater than 50%, no greater than 45%, or no greater than 40%.

Embodiment 6

The composite fabric laminate or method of any one of the preceding embodiments, wherein the open mesh fabric has an open area of at least 10%, at least 15%, at least 20%, or even at least 50%.

Embodiment 7

The composite fabric laminate or method of any one of the preceding embodiments, wherein the open mesh fabric has an open area in a range of 10% to 50%, 15% to 45%, or 20% to 40%.

Embodiment 8

The composite fabric laminate or method of any one of the preceding embodiments, wherein the open mesh fabric includes a material formed of fibers comprising an aramid, a fluorinated polymer, a fiberglass, a graphite, a polyimide, a polyphenylene sulfide, a polyketone, a polyester, or a combination thereof.

Embodiment 9

The composite fabric laminate or method of any one of the preceding embodiments, wherein the open mesh fabric includes a material formed of fibers comprising a fiberglass.

Embodiment 10

The composite fabric laminate or method of any one of the preceding embodiments, wherein, apart from the first and second continuous films, the open mesh fabric includes a coated material, such as a material coated with a polymeric coating, such as a fluoropolymer coating, or even a polytetrafluoroethylene (PTFE) coating.

Embodiment 11

The composite fabric laminate or method of any one of the preceding embodiments, wherein, apart from the first and second continuous films, the open mesh fabric includes a coated fiberglass material, such as a fiberglass material coated with a polymeric coating, such as a fluoropolymer coating, or even a polytetrafluoroethylene (PTFE) coating.

Embodiment 12

The composite fabric laminate or method of any one of the preceding embodiments, wherein the open mesh fabric has a weight of at least 100 grams per square meter (gsm), at least 350 gsm, at least 400 gsm, at least 450 gsm, or at least 500 gsm.

Embodiment 13

The composite fabric laminate or method of any one of the preceding embodiments, wherein the open mesh fabric has a weight of no greater than 1500 gsm, no greater than 1400 gsm, no greater than 1300 gsm, or no greater than 1200 gsm.

Embodiment 14

The composite fabric laminate or method of any one of the preceding embodiments, wherein the open mesh fabric has a weight in a range of 350 to 1500 gsm, 400 to 1400 gsm, 450 to 1300 gsm, or 500 to 1200 gsm.

Embodiment 15

The composite fabric laminate or method of any one of the preceding embodiments, wherein one or both of the first and second continuous films comprise(s) a fluoropolymer, such as a perfluoropolymer, such as a fluoropolymer comprising a polytetrafluoroethylene (PTFE), a perfluoroalkyl-vinyl ether (PFA), a polyhexafluoropropylene (HFP), a fluorinated ethylene-propylene copolymer (FEP), an ethylene tetrafluoroethylene copolymer (ETFE), a polyvinylidene fluoride (PVDF), a polychlorotrifluoroethylene (PCTFE), a modified PTFE including a perfluoropropylene-vinyl-ether, a perfluoromethyl vinyl ether (MFA), or any combination thereof.

Embodiment 16

The composite fabric laminate or method of any one of the preceding embodiments, wherein the composite fabric includes a pigment.

Embodiment 17

The composite fabric laminate or method of any one of the preceding embodiments, wherein one or both of the first and second continuous films is free of a fluorinated ethylene-propylene copolymer (FEP).

Embodiment 18

The composite fabric laminate or method of any one of the preceding embodiments, wherein the composite fabric laminate is free of a fluorinated ethylene-propylene copolymer (FEP).

Embodiment 19

The composite fabric laminate or method of any one of the preceding embodiments, wherein one or both of the first and second continuous films comprises an extruded film, a skived film, or a cast film.

Embodiment 20

The composite fabric laminate or method of any one of the preceding embodiments, wherein one or both of the first and second continuous films comprises a cast film.

Embodiment 21

The composite fabric or method of any one of the preceding embodiments, wherein both of the first and second continuous films comprises a cast film.

Embodiment 22

The composite fabric laminate or method of any one of the preceding embodiments, wherein both of the first and second continuous films comprises a colored or tinted film.

Embodiment 23

The composite fabric laminate or method of any one of the preceding embodiments, wherein one or both of the first and second continuous films comprises infrared (IR) reflective additives IR absorbing additives, or a combination thereof.

Embodiment 24

The composite fabric laminate or method of any one of the preceding embodiments, wherein both of the first and second continuous films comprises glass beads.

Embodiment 25

The composite fabric laminate or method of any one of the preceding embodiments, wherein composite fabric comprises a photocatalytic surface having an activity of at least 5 mol/m$^2$ h, or at least 7 mol/m$^2$ h, at least 9 mol/m$^2$ h, or even at least 10 mol/m$^2$ h.

Embodiment 26

The composite fabric laminate or method of any one of the preceding embodiments, wherein the composite fabric comprises a photocatalytic surface having an activity of no greater than 40 mol/m$^2$ h, no greater than 35 mol/m$^2$ h, or no greater than 30 mol/m$^2$ h.

Embodiment 27

The composite fabric laminate or method of any one of the preceding embodiments, wherein the composite fabric comprises a photocatalytic surface having an activity in a range of 5 to 40 mol/m² h, 7 to 35 mol/m² h, or even 10 to 30 mol/m² h.

Embodiment 28

The composite fabric laminate or method of any one of the preceding embodiments, wherein the composite fabric laminate comprises the open mesh fabric in an amount of at least 10 wt. %, at least 15 wt. %, at least 20 wt. %, at least 25 wt. %, at least 30 wt. %, at least 35 wt. %, or even at least 40 wt. %, by weight of the composite fabric laminate.

Embodiment 29

The composite fabric laminate or method of any one of the preceding embodiments, wherein the composite fabric laminate comprises the open mesh fabric in an amount of no greater than 60 wt. %, no greater than 55 wt. %, or no greater than 50 wt. %, by weight of the composite fabric laminate.

Embodiment 30

The composite fabric laminate or method of any one of the preceding embodiments, wherein the composite fabric laminate comprises the open mesh fabric in an amount in a range of 10 wt. % to 60 wt. %, 20 wt. % to 55 wt. %, or 30 wt. % to 50 wt. %, by weight of the composite fabric laminate.

Embodiment 31

The composite fabric laminate or method of any one of the preceding embodiments, wherein the composite fabric laminate comprises an outermost surface having a substantially uniform contour.

Embodiment 32

The composite fabric laminate or method of any one of embodiments 2 to 28, wherein the composite fabric laminate has a VLT of at least 6%, at least 8%, at least 10%, at least 15%, at least 20%, at least 26%, at least 28%, at least 30%, or at least 32%.

Embodiment 33

The composite fabric laminate or method of any one of the preceding embodiments, wherein the composite fabric laminate has a VLT of no greater than 99%, no greater than 95%, no greater than 90%, or even no greater than 85%.

Embodiment 34

The composite fabric laminate or method of any one of the preceding embodiments, wherein the composite fabric laminate has a VLT in a range of 26% to 99%, 28% to 95%, 30% to 90%, or even 32% to 85%.

Embodiment 35

The composite fabric laminate or method of any one of the preceding embodiments, wherein the composite fabric laminate has a solar heat gain coefficient (SHGC) of no greater than 0.5, no greater than 0.4, or no greater than 0.3.

Embodiment 36

The composite fabric laminate or method of any one of the preceding embodiments, wherein the composite fabric laminate has a solar heat gain coefficient (SHGC) of at least 0.05, at least 0.1, at least 0.15, or at least 0.2.

Embodiment 37

The composite fabric laminate or method of any one of the preceding embodiments, wherein the composite fabric laminate has a solar heat gain coefficient (SHGC) in a range of 0.05 to 0.5, 0.1 to 0.4, or 0.2 to 0.3.

Embodiment 38

The composite fabric laminate or method of any one of the preceding embodiments, wherein the composite fabric laminate has a tensile strength in a range of 200 to 1200 PLI, or in a range of 500 to 1200 PLI, measured according to ASTM D4851-88.

Embodiment 39

The composite fabric laminate or method of any one of the preceding embodiments, wherein the composite fabric laminate has an elongation of at least 1%, at least 1.5%, or at least 2%.

Embodiment 40

The composite fabric laminate or method of any one of the preceding embodiments, wherein the composite fabric laminate has an elongation of no greater than 15%, no greater than 8%, or no greater than 4%.

Embodiment 41

The composite fabric laminate or method of any one of the preceding embodiments, wherein the composite fabric laminate has an elongation in a range of 1% to 15%, 1.5% to 8%, or 2% to 4%.

Embodiment 42

The composite fabric laminate or method of any one of the preceding embodiments, wherein the composite fabric laminate has a flexfold resistance of at least 60%, at least 70%, at least 80%, or at least 90%.

Embodiment 43

The coated fabric or method of any one of the preceding embodiments, wherein the coated fabric has a vapor permeation rate in a range of 1 g/[m²-day] to 10 g/[m²-day], or in a range of 10 g/[m²-day] to 20 g/[m²-day], measured according to ASTM F1249.

Embodiment 44

The method of any one of the preceding embodiments, wherein the laminating is performed at a pressure of at least 100 psig, at least 200 psig, at least 300 psig, at least 400 psig, at least 500 psig, at least 600 psig, at least 700 psig, or even at least 800 psig.

Embodiment 45

The method of any one of the preceding embodiments, wherein the laminating is performed at a pressure of no greater than 2500 psig, no greater than 2300 psig, no greater than 2100 psig, no greater than 1900 psig, or even no greater than 1700 psig.

Embodiment 46

The method of any one of the preceding embodiments, wherein the laminating is performed at a pressure in a range of 200 psig to 2500 psig, 300 psig to 2300 psig, 400 psig to 2100 psig, 500 psig to 1900 psig, or even 600 psig to 1700 psig.

Embodiment 47

The method of any one of the preceding embodiments, wherein the laminating is performed at a temperature of no greater than 350° C., no greater than 300° C., no greater than 250° C., no greater than 200° C., no greater than 175° C., or even no greater than 150° C.

Embodiment 48

The method of any one of the preceding embodiments, wherein the laminating is performed at a temperature of at least 100° C., at least 110° C., or at least 120° C.

Embodiment 49

The method of any one of the preceding embodiments, wherein the laminating is performed at a temperature in a range of 100° C. to 350° C., 110° C. to 300° C., or 120° C. to 200° C.

Embodiment 50

The method of any one of the preceding embodiments, wherein the sintering is performed at a temperature of at least 350° C., at least 375° C., or at least 400° C.

Embodiment 51

An architectural fabric comprising the composite fabric laminate of any one of the preceding embodiments.

Embodiment 52

An architectural structure comprising the composite fabric laminate of any one of the preceding embodiments.

Embodiment 53

The architectural structure of embodiment 52, wherein the architectural structure comprises a skylight, a roof, or a façade.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A composite fabric laminate comprising:
   an open mesh fabric having an open area of at least 15%;
   a first continuous film comprising polytetrafluoroethylene (PTFE); and
   a second continuous film comprising polytetrafluoroethylene (PTFE),
   wherein the first and second continuous films are disposed on opposing surfaces of the open mesh fabric,
   wherein the polytetrafluoroethylene (PTFE) of the first continuous film directly contacts the polytetrafluoroethylene (PTFE) of the second continuous film, and
   wherein the composite fabric laminate has a visible light transmission (VLT) of at least 20% and a tensile strength of at least 200 pounds per linear inch (PLI).

2. The composite fabric laminate of claim 1, wherein the open mesh fabric has an open area in a range of 20% to 40%.

3. The composite fabric laminate of claim 1, wherein the open mesh fabric includes a material formed of fibers comprising an aramid.

4. The composite fabric laminate of claim 1, wherein the open mesh fabric includes a material formed of fibers comprising a fiberglass.

5. The composite fabric laminate of claim 1, wherein the composite fabric includes a pigment.

6. The composite fabric laminate of claim 1, wherein, apart from the first and second continuous films, the open mesh fabric includes a fiberglass material having a polytetrafluoroethylene (PTFE) coating.

7. The composite fabric laminate of claim 1, wherein, apart from the first and second continuous films, the open mesh fabric includes a coated material having a polytetrafluoroethylene (PTFE) coating.

8. The composite fabric laminate of claim 1, wherein one or both of the first and second continuous films comprises an extruded film, a skived film, or a cast film.

9. The composite fabric laminate of claim 1, wherein both of the first and second continuous films comprises a colored or tinted film.

10. The composite fabric laminate of claim 1, wherein one or both of the first and second continuous films comprises infrared (IR) reflective additives, IR absorbing additives, or a combination thereof.

11. The composite fabric laminate of claim 1, wherein the composite fabric comprises a photocatalytic surface having an activity in a range of 5 to 40 mol/m² h.

12. The composite fabric laminate of claim 1, wherein the composite fabric laminate comprises an outermost surface having a substantially uniform contour.

13. The composite fabric laminate of claim 1, wherein the composite fabric laminate has a VLT in a range of 20% to 90%.

14. The composite fabric laminate of claim 1, wherein the composite fabric laminate has a solar heat gain coefficient (SHGC) in a range of 0.05 to 0.5.

15. The composite fabric laminate of claim 1, wherein the composite fabric laminate has a flexfold resistance of at least 60%.

16. An architectural fabric comprising the composite fabric laminate of claim 1.

17. An architectural structure comprising the composite fabric laminate of claim 1.

18. The architectural structure of claim 17, wherein the architectural structure comprises a skylight, a roof, or a façade.

19. The architectural structure of claim 17, wherein the architectural structure comprises a radome.

20. A method of forming a composite fabric laminate, comprising:
- disposing an open mesh fabric between a first continuous film and a second continuous film to form a composite, wherein the first continuous film and the second continuous film each comprise an at least partially unsintered fluoropolymer film;
- laminating the composite at a pressure of at least 100 psig and a temperature of no greater than 350° C.; and
- sintering the laminated composite to form the composite fabric laminate.

* * * * *